US010656280B2

(12) United States Patent
Cooper et al.

(10) Patent No.: US 10,656,280 B2
(45) Date of Patent: May 19, 2020

(54) VEHICLE MONITORING SYSTEMS AND METHODS

(71) Applicant: Key Control Holding, Inc., Houston, TX (US)

(72) Inventors: Christopher Cooper, College Station, TX (US); Carlan Cooper, Bryan, TX (US); Robert T. Brockman, Houston, TX (US)

(73) Assignee: KEY CONTROL HOLDING, INC., Houston, TX (US)

( * ) Notice: Subject to any disclaimer, the term of this patent is extended or adjusted under 35 U.S.C. 154(b) by 680 days.

(21) Appl. No.: 14/700,910

(22) Filed: Apr. 30, 2015

(65) Prior Publication Data

US 2015/0332592 A1 Nov. 19, 2015

Related U.S. Application Data

(60) Provisional application No. 61/992,503, filed on May 13, 2014.

(51) Int. Cl.
| | |
|---|---|
| *G01S 19/31* | (2010.01) |
| *G08G 1/127* | (2006.01) |
| *G01S 19/13* | (2010.01) |
| *G07C 5/00* | (2006.01) |
| *H04W 4/40* | (2018.01) |
| *H04W 4/029* | (2018.01) |
| *G08G 1/00* | (2006.01) |

(52) U.S. Cl.
CPC ............. *G01S 19/13* (2013.01); *G07C 5/008* (2013.01); *G08G 1/127* (2013.01); *G08G 1/20* (2013.01); *H04W 4/029* (2018.02); *H04W 4/40* (2018.02)

(58) Field of Classification Search
CPC ........ G08G 1/127; G01S 19/13; G07C 5/008; H04W 4/02
USPC ........................................................ 340/989
See application file for complete search history.

(56) References Cited

U.S. PATENT DOCUMENTS

| | | | |
|---|---|---|---|
| 5,499,182 A * | 3/1996 | Ousborne | G06F 11/34 340/439 |
| 6,052,646 A * | 4/2000 | Kirkhart | G01C 21/26 701/490 |
| 6,225,898 B1 | 5/2001 | Kamiya et al. | |
| 6,295,492 B1 | 9/2001 | Lang et al. | |
| 6,330,499 B1 | 12/2001 | Chou et al. | |
| 6,339,745 B1 | 1/2002 | Novik | |
| 6,434,455 B1 | 8/2002 | Snow | |
| 6,505,106 B1 | 1/2003 | Lawrence et al. | |
| 6,526,340 B1 | 2/2003 | Reul et al. | |
| 6,529,808 B1 | 3/2003 | Diem | |
| 6,556,905 B1 | 4/2003 | Mittelsteadt et al. | |
| 6,604,033 B1 | 8/2003 | Banet et al. | |
| 6,611,740 B2 | 8/2003 | Lowrey et al. | |
| 6,636,790 B1 | 10/2003 | Lightener et al. | |

(Continued)

OTHER PUBLICATIONS

Search Report issued in GB Application No. 1507552.6, dated Nov. 2, 2015, 4 pages.

*Primary Examiner* — John F Mortell
(74) *Attorney, Agent, or Firm* — Adolph Locklar

(57) ABSTRACT

An embodiment includes a lot management system. The lot management system includes a transmitter comprising a location determination module having a GPS data pathway to an RF transmission module and a receiver including an RF antenna and a receiver processor.

24 Claims, 4 Drawing Sheets

(56) References Cited

U.S. PATENT DOCUMENTS

| | | | |
|---|---|---|---|
| 6,732,031 B1 | 5/2004 | Lightener et al. |
| 6,732,032 B1 | 5/2004 | Banet et al. |
| 6,807,469 B2 | 10/2004 | Funkhouser et al. |
| 6,810,309 B2 | 10/2004 | Sadler et al. |
| 6,823,243 B2 | 11/2004 | Chinnadurai et al. |
| 6,832,141 B2 | 12/2004 | Skeen et al. |
| 6,836,708 B2 | 12/2004 | Triphath |
| 6,879,894 B1 | 4/2005 | Lightener et al. |
| 6,882,917 B2 | 4/2005 | Pillar et al. |
| 6,885,920 B2 | 4/2005 | Yakes et al. |
| 6,920,381 B2 | 7/2005 | Doherty et al. |
| 6,928,348 B1 | 8/2005 | Lightener et al. |
| 6,931,309 B2 | 8/2005 | Phelan et al. |
| 6,947,816 B2 | 9/2005 | Chen |
| 6,993,421 B2 | 1/2006 | Pillar et al. |
| 7,004,206 B2 | 2/2006 | Viken et al. |
| 7,113,127 B1 | 9/2006 | Banet et al. |
| 7,174,243 B1 | 2/2007 | Lightner et al. |
| 7,184,866 B2 | 2/2007 | Squires et al. |
| 7,212,893 B2 | 5/2007 | Doherty et al. |
| 7,225,065 B1 | 5/2007 | Hunt et al. |
| 7,228,211 B1 | 6/2007 | Lowrey et al. |
| 7,317,974 B2 | 1/2008 | Luskin et al. |
| 7,342,494 B2 | 3/2008 | Maloney |
| 7,398,176 B2 | 7/2008 | Bertness |
| 7,447,574 B1 | 11/2008 | Washicko et al. |
| 7,477,968 B1 | 1/2009 | Lowrey et al. |
| 7,480,551 B1 | 1/2009 | Lowrey et al. |
| 7,519,458 B2 | 4/2009 | Buckley |
| 7,532,962 B1 | 5/2009 | Lowrey et al. |
| 7,532,963 B1 | 5/2009 | Lowrey et al. |
| 7,577,503 B2 | 8/2009 | Bertosa et al. |
| 7,584,030 B1 | 9/2009 | Graham |
| 7,593,999 B2 | 9/2009 | Nathanson |
| 7,596,435 B1 | 9/2009 | Tripathi et al. |
| 7,596,437 B1 | 9/2009 | Hunt et al. |
| 7,598,744 B2 | 10/2009 | Bertness et al. |
| 7,650,210 B2 | 1/2010 | Breed |
| 7,672,763 B1 | 3/2010 | Hunt et al. |
| 7,747,365 B1 | 6/2010 | Lowrey et al. |
| 7,778,752 B1 | 8/2010 | Hunt et al. |
| 7,853,375 B2 | 12/2010 | Tuff |
| 7,860,619 B2 | 12/2010 | Bertosa et al. |
| 7,904,219 B1 | 3/2011 | Lowrey et al. |
| 8,019,501 B2 | 9/2011 | Breed |
| 8,027,763 B2 | 9/2011 | Webster et al. |
| 8,036,788 B2 | 10/2011 | Breed |
| 8,055,403 B2 | 11/2011 | Lowrey et al. |
| 8,108,093 B2 | 1/2012 | Bertosa et al. |
| 8,140,358 B1 | 3/2012 | Ling et al. |
| 8,145,379 B2 | 3/2012 | Schwinke |
| 8,165,781 B2 | 4/2012 | Johnson et al. |
| 8,214,100 B2 | 7/2012 | Lowrey et al. |
| 8,237,448 B2 | 8/2012 | Bertness |
| 8,296,008 B2 | 10/2012 | Sampson et al. |
| 8,355,837 B2 | 1/2013 | Avery et al. |
| 8,370,016 B2 | 2/2013 | Webster et al. |
| 8,437,903 B2 | 5/2013 | Willard |
| 8,447,459 B2 | 5/2013 | Lowrey et al. |
| 8,452,478 B2 | 5/2013 | Bertosa et al. |
| 8,452,486 B2 | 5/2013 | Banet et al. |
| 8,452,673 B2 | 5/2013 | Boling et al. |
| 8,478,514 B2 | 7/2013 | Kargupta |
| 8,480,433 B2 | 7/2013 | Huang |
| 8,493,022 B2 | 7/2013 | Bertness |
| 8,509,987 B2 | 8/2013 | Resner |
| 8,527,135 B2 | 9/2013 | Lowrey et al. |
| 8,527,485 B2 | 9/2013 | Marzani et al. |
| 8,532,866 B1 | 9/2013 | Palmer |
| 8,558,678 B2 | 10/2013 | Van Wiemeersch et al. |
| 8,565,963 B2 | 10/2013 | Burke |
| 8,612,086 B2 | 12/2013 | Jardine |
| 8,624,758 B2 | 1/2014 | Ingram et al. |
| 8,630,768 B2 | 1/2014 | McClellan et al. |
| 8,635,091 B2 | 1/2014 | Amigo et al. |
| 8,638,202 B2 | 1/2014 | Oesterling |
| 8,666,588 B2 | 3/2014 | Geilen et al. |
| 8,676,439 B2 | 3/2014 | Huang |
| 8,677,019 B2 | 3/2014 | Bruenner et al. |
| 8,688,313 B2 | 4/2014 | Margol et al. |
| 8,700,254 B2 | 4/2014 | Basir et al. |
| 8,700,255 B2 | 4/2014 | Joseph |
| 8,731,764 B2 | 5/2014 | Bertosa et al. |
| 8,788,139 B2 | 7/2014 | Fedor et al. |
| 8,799,035 B2 | 8/2014 | Coleman et al. |
| 8,805,281 B2 | 8/2014 | Hsu et al. |
| 8,812,173 B2 | 8/2014 | Chen et al. |
| 8,818,616 B2 | 8/2014 | Sampson et al. |
| 8,825,270 B2 | 9/2014 | Chen |
| 8,838,362 B2 | 9/2014 | Higgins et al. |
| 8,843,263 B2 | 9/2014 | Willard |
| 8,850,083 B2 | 9/2014 | Raichle et al. |
| 8,868,285 B2 | 10/2014 | Park |
| 8,868,289 B2 | 10/2014 | Miljkovic et al. |
| 8,886,391 B2 | 11/2014 | Bertosa et al. |
| 8,897,952 B1 | 11/2014 | Palmer |
| 8,903,597 B2 | 12/2014 | Jones |
| 8,918,232 B2 | 12/2014 | Lavi et al. |
| 9,002,554 B2 | 4/2015 | Chen |
| 9,026,306 B2 | 5/2015 | Wu et al. |
| 9,031,710 B2 | 5/2015 | Barrett |
| 9,038,447 B2 | 5/2015 | Miller |
| 9,052,366 B2 | 6/2015 | Bertness |
| 9,053,591 B2 | 6/2015 | Phelan et al. |
| 9,070,168 B2 | 6/2015 | Amigo et al. |
| 9,080,519 B2 | 7/2015 | Howell et al. |
| 9,081,650 B1 | 7/2015 | Brinkmann et al. |
| 9,097,195 B2 | 8/2015 | Willard et al. |
| 9,098,388 B2 | 8/2015 | Cho et al. |
| 9,103,737 B2 | 8/2015 | Vaeretti et al. |
| 9,117,319 B2 | 8/2015 | Chen |
| 9,129,336 B2 | 9/2015 | Ehrman |
| 9,142,065 B2 | 9/2015 | Rude et al. |
| 9,175,649 B2 | 11/2015 | McGuffin |
| 9,181,895 B2 | 11/2015 | Roberts et al. |
| 9,189,895 B2 | 11/2015 | Phelan et al. |
| 9,196,098 B2 | 11/2015 | Phelan et al. |
| 9,208,525 B2 | 12/2015 | Hayward et al. |
| 9,208,623 B2 | 12/2015 | Baumert et al. |
| 9,208,624 B2 | 12/2015 | Rude et al. |
| 9,224,249 B2 | 12/2015 | Lowrey et al. |
| 9,245,392 B2 | 1/2016 | Yang et al. |
| 9,246,288 B2 | 1/2016 | Jones |
| 9,248,789 B2 | 2/2016 | Quintero |
| 9,251,628 B2 | 2/2016 | Ubik et al. |
| 9,281,647 B2 | 3/2016 | Krivtsov et al. |
| 9,286,265 B2 | 3/2016 | Simard et al. |
| 9,297,721 B2 | 3/2016 | Bertosa et al. |
| 9,311,758 B2 | 4/2016 | Choi |
| 9,324,192 B2 | 4/2016 | Chakravarty et al. |
| 9,349,223 B1 | 5/2016 | Palmer |
| 9,363,647 B2 | 6/2016 | Kim |
| 9,367,968 B2 | 6/2016 | Giraud et al. |
| 9,373,201 B2 | 6/2016 | Jeffries et al. |
| 9,384,598 B2 | 7/2016 | Berkobin et al. |
| 9,384,599 B2 | 7/2016 | Chen et al. |
| 9,417,078 B1 | 8/2016 | Seibert |
| 9,418,383 B1 | 8/2016 | Hayward et al. |
| 9,421,982 B2 | 8/2016 | Phelan et al. |
| 2002/0089434 A1* | 7/2002 | Ghazarian ............... G08G 1/20 340/988 |
| 2008/0165030 A1* | 7/2008 | Kuo ............... G06Q 10/02 340/932.2 |
| 2010/0060485 A1* | 3/2010 | Kim ............... G08G 1/143 340/932.2 |
| 2011/0093159 A1 | 4/2011 | Boling et al. |
| 2011/0227709 A1* | 9/2011 | Story ............... B60R 25/102 340/10.42 |
| 2014/0067231 A1* | 3/2014 | Mosher ............... F02D 28/00 701/102 |

* cited by examiner

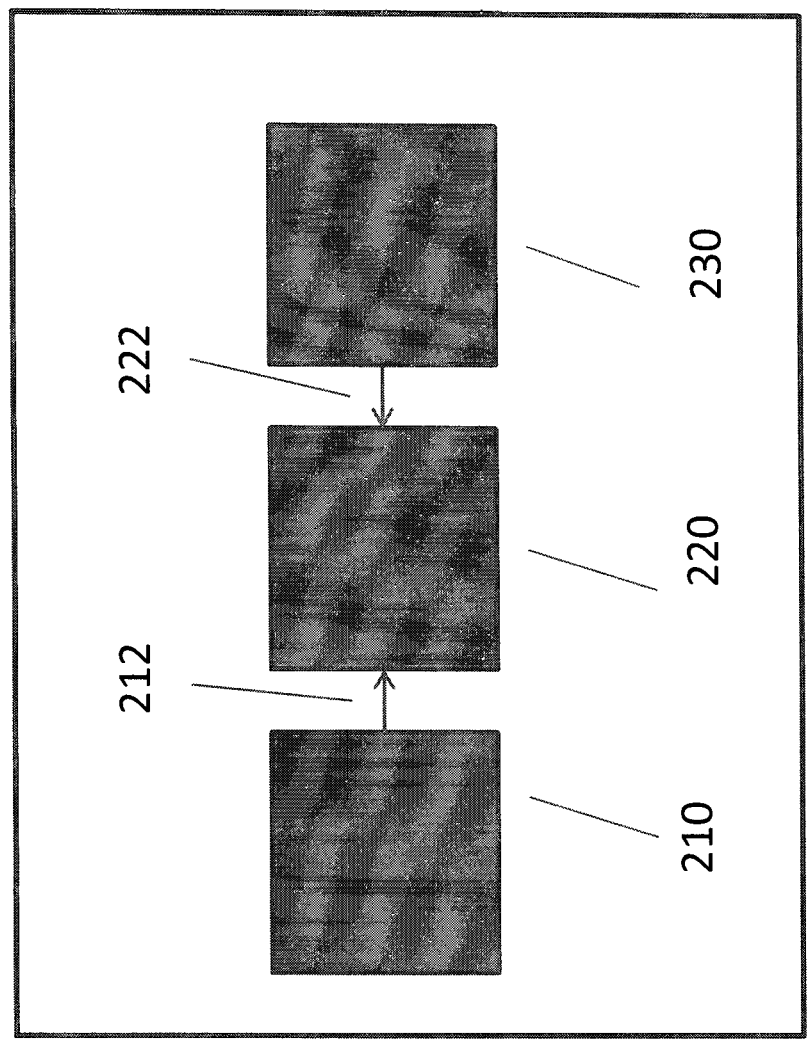

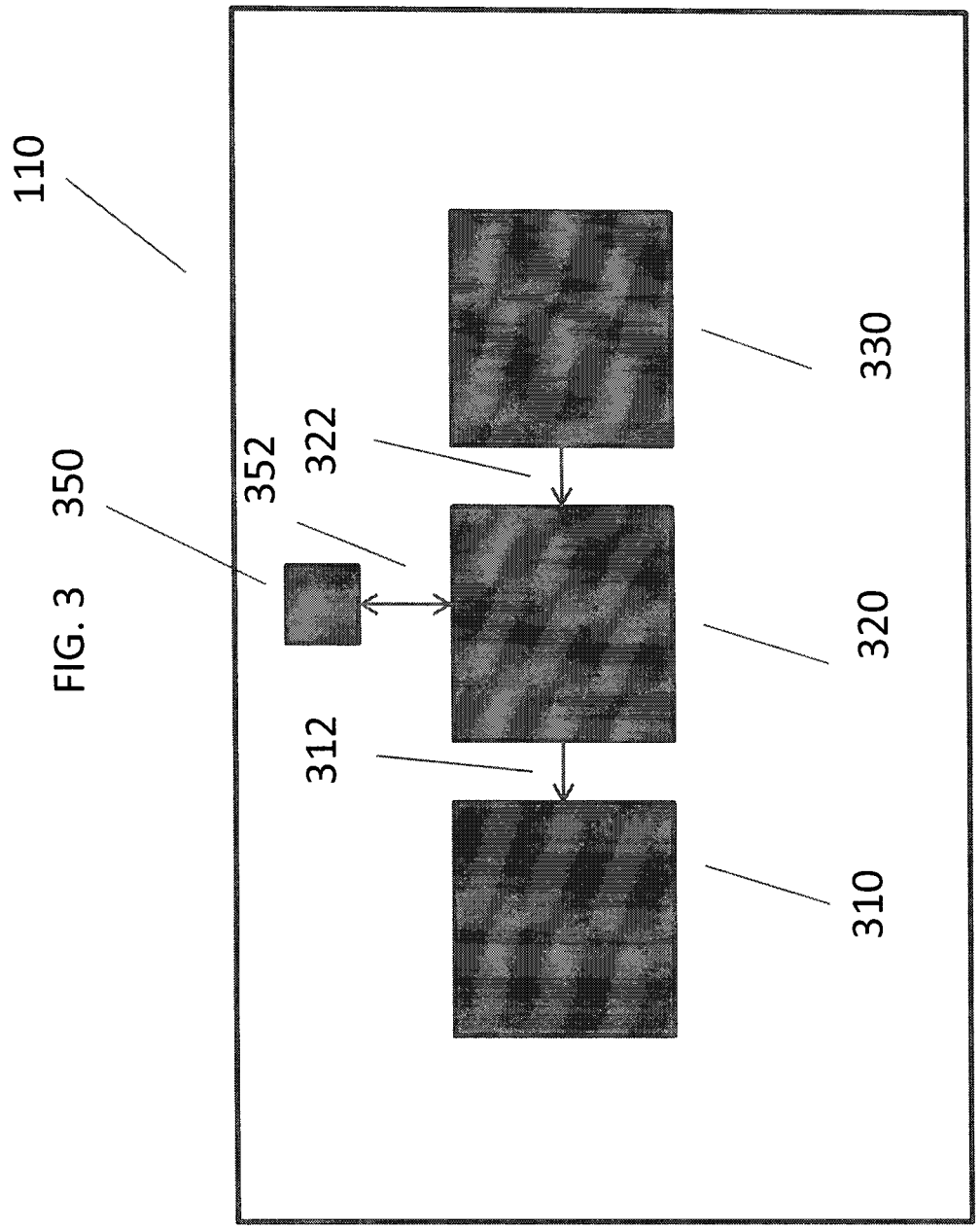

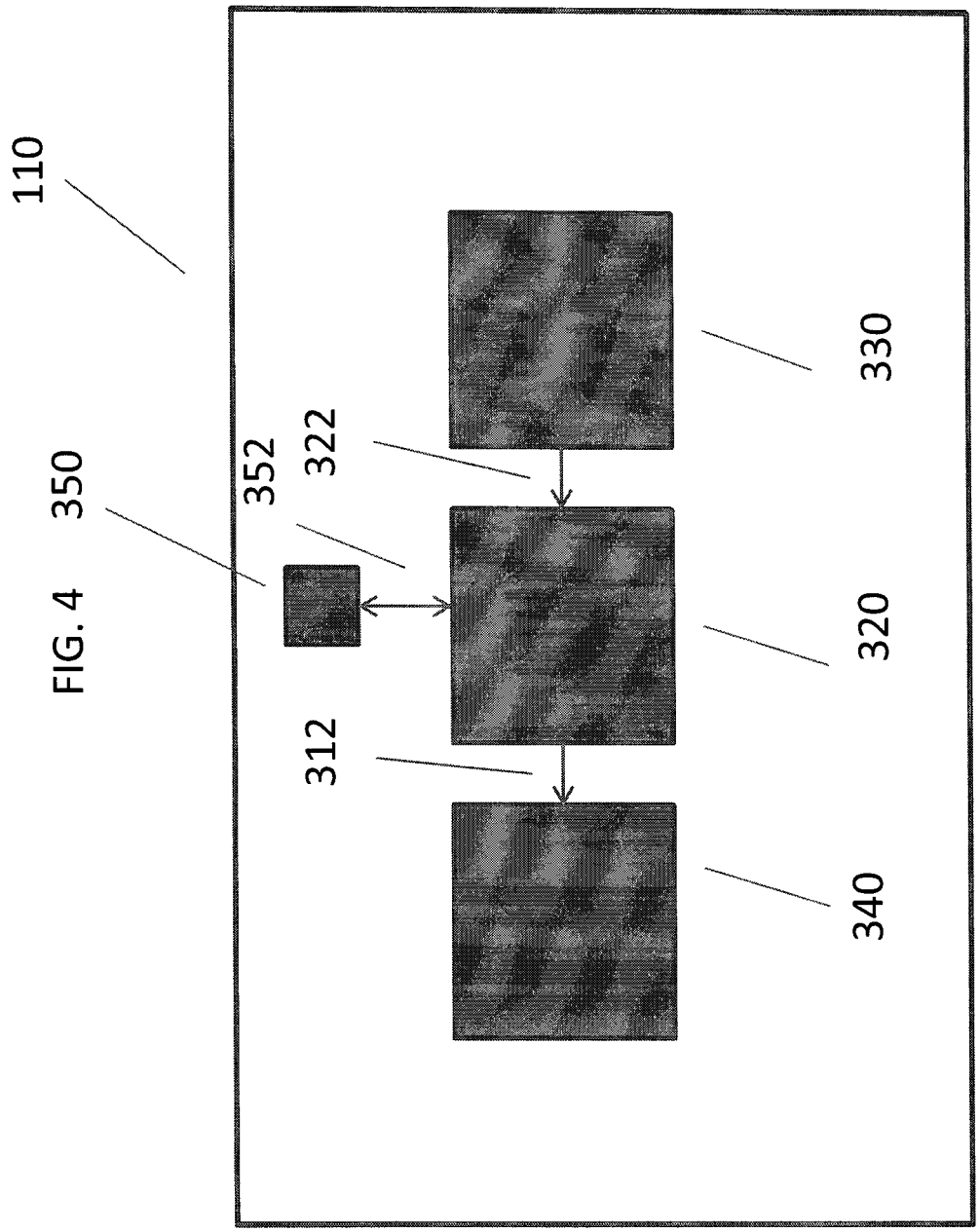

VEHICLE MONITORING SYSTEMS AND METHODS

CROSS-REFERENCE TO RELATED APPLICATIONS

This application is a non-provisional application which claims priority from U.S. provisional application No. 61/992,503, filed May 13, 2014, which is incorporated by reference herein in its entirety.

TECHNICAL FIELD/FIELD OF THE DISCLOSURE

The present disclosure relates to vehicle management systems.

BACKGROUND OF THE DISCLOSURE

Automobile dealerships often have horizontally-spread inventory of new and/or used vehicles across a car lot, many of which may appear similar but have different options packages. Further, the location of these vehicles may change, for instance, due to turnover in inventory, customer test drives, or other vehicle movement. In addition, as vehicles remain on the lot, there may be a need to perform limited maintenance to assure the vehicle remains ready for purchase.

SUMMARY

An embodiment includes a lot management system. The lot management system includes a transmitter comprising a location determination module having a GPS data pathway to an RF transmission module and a receiver including an RF antenna and a receiver processor.

Another embodiment is directed to a process. The process includes providing a vehicle management system. The vehicle management system includes a transmitter in electrical contact with a vehicle, wherein the transmitter comprises a location determination module having a GPS data pathway to an RF transmission module and a vehicle information module having a vehicle information data pathway to the RF transmission module. The vehicle management system further includes a receiver having an RF antenna, a receiver processor, and a receiver database. The receiver database includes a non-transitory, tangible computer readable storage medium. The process further includes determining a location of the transmitter using the location determination module and transmitting the location of the transmitter using the RF transmission module. In addition, the process includes receiving the location of the transmitter using the RF antenna and storing the location of the transmitter in the receiver database.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 2 is a schematic of a transmitter of a lot management system consistent with at least one embodiment of the present disclosure.

FIG. 3 is a schematic of a receiver of a lot management system consistent with at least one embodiment of the present disclosure.

FIG. 4 is a schematic of a receiver of a lot management system consistent with at least one embodiment of the present disclosure.

DETAILED DESCRIPTION

Figure 1:
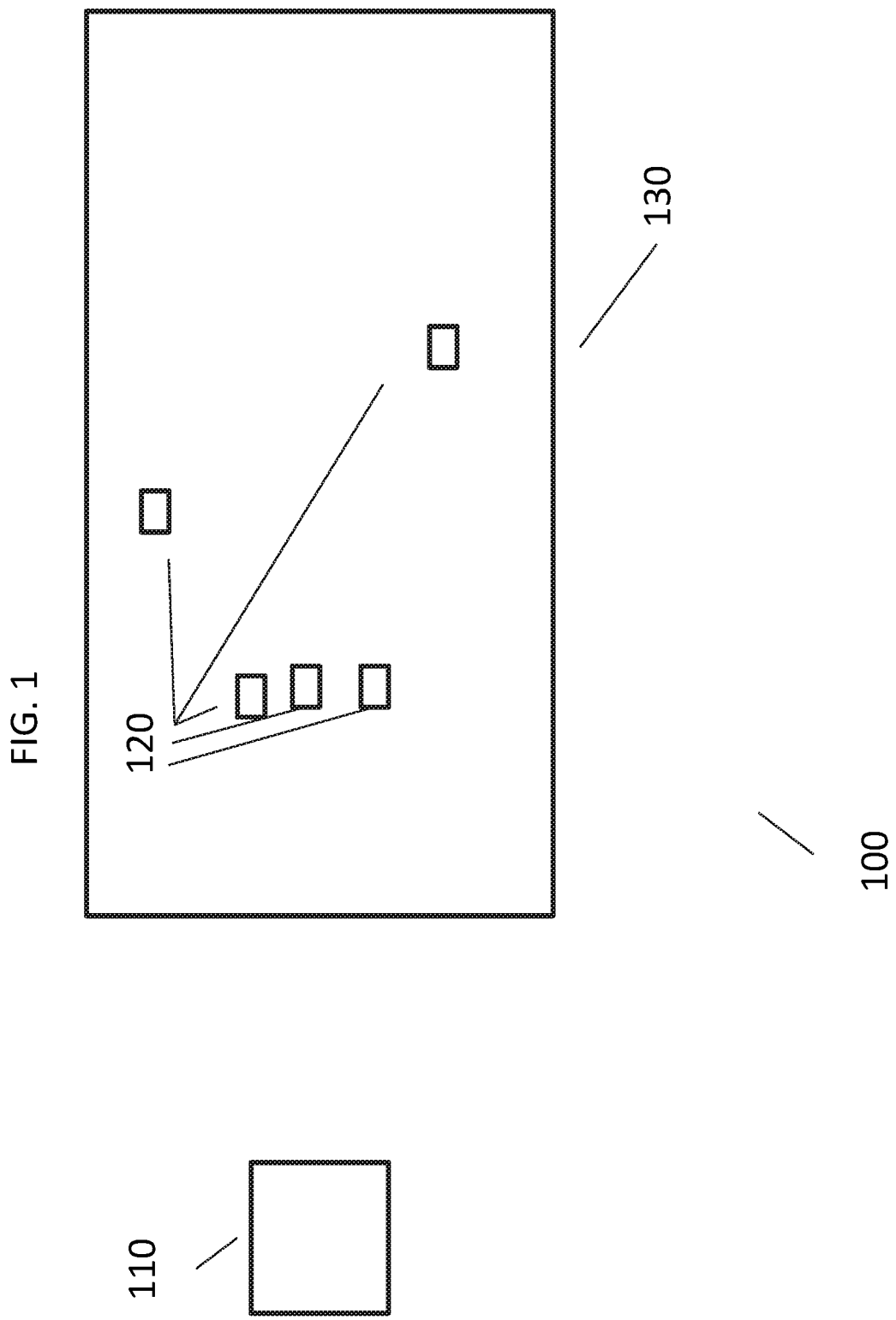
FIG. 1 is a schematic of a lot management system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Certain embodiments of the present disclosure are directed to systems and methods for locating vehicles on a car lot. The embodiments may include at least one receiver station and one or more transmitters. FIG. 1 is a schematic of one embodiment of lot management system 100 consistent with the present disclosure.

FIG. 1 depicts receiver 110 and a plurality of transmitters 120. Transmitters 120 may be associated with individual vehicles. Transmitters 120 and associated vehicles are shown in FIG. 1 as located on car lot 130.

As shown in FIG. 2, transmitters 120 include location determination module 210 and transmission module 220. Location determination module 210 may be any module capable of determining the location of the vehicle on car lot 130 within 30 feet, 20 feet or 10 feet of the actual location of transmitter 120. In certain non-limiting embodiments, location determination module 210 is a GPS locator module which is configured to receive a GPS signal and may calculate or determine a GPS location based on that signal. Transmission module 220 as shown in FIG. 2 is a radio frequency (RF) transmitter. Transmission module 220 receives GPS location information from location determination module 210 through location GPS data pathway 212. Transmission module 220 may be configured to transmit the GPS location only while transmitter 120 is located within car lot 130. Transmission module 220 may transmit in the UHF bandwidth. In some embodiments, transmission module 220 does not transmit a cellular signal. In certain non-limiting embodiments of the present disclosure, transmission module 220 may transmit signals that conform to the JenNet or ZigBee® protocol.

In certain embodiments, transmitter 120 may further include vehicle information module 230. In other embodiments (not shown), transmitter 120 does not include vehicle information module 230. Vehicle information module 230 may be adapted to communicate with one or more computer systems of the vehicle. Vehicle information module 230 may gather vehicle information from the vehicle and pass that information to transmission module 220 through vehicle information data pathway 222.

In some non-limiting embodiments, vehicle information module 230 is configured to meet OBD-II standards in terms of, for example, diagnostic connector and its pinout, electrical signaling protocols and messaging format. In certain embodiments of the present disclosure, vehicle information module 230 may receive power from the vehicle's battery through a power pin connector (not shown). Power pin connector may be configured in accordance with OBD-II standards. Vehicle information module 230 may gather information such as, but not limited to VIN, battery voltage, alternator voltage, fuel level, engine RPMs, vehicle speed, distance traveled since codes last cleared, run time since engine start and other parameters, such as those specified in the OBD-II standard. Vehicle information module 230 may be configured in accordance with OBD-II standards to plug into or be removed from a vehicle's OBD-II port. When so configured, transmitter 120 may be removable from the vehicle, for instance, when the vehicle is purchased, and reused on a different vehicle.

Transmitter 120 may be associated with a particular identifier, such as a serial number, that may be transmitted via transmitter module 220 to receiver 110. The particular identifier may be stored in a transmission module processor or memory associated with a transmission module processor. In certain embodiments, vehicle information module 230, transmitter module 220 and location determination module 210 may be powered by the vehicle battery, such as through the power pin connector. In other embodiments, vehicle information module 230, transmitter module 220 and location determination module 210 are powered with a battery other than that of the vehicle battery. In still other embodiments, vehicle information module 230, transmitter module 220 and location determination module 210 are powered by the vehicle battery and a battery other than that of the vehicle battery.

Transmission module 220 may contain a transmission module processor that controls and processes data received from, for instance, location determination module 210 and vehicle information module 230, which is described below. The transmission module processor of transmission module 220 may include in the processor or memory associated with the transmission module processor code instructions to transmit information to receiver station 110 continuously, at pre-determined times, or may use the information obtained from location determination module 210 or vehicle information module 230 to determine when to transmit information to receiver station 110. The code instructions may be stored on a non-transitory, tangible computer readable storage medium. As an example, when vehicle information module 230 communicates to transmission module 220 that the measured voltage is such that the engine of the vehicle is running, transmission module may transmit vehicle location more frequently than if the measured voltage is such that the engine of the vehicle is not running. As another example, if the engine of the vehicle is running, transmission module 220 may transmit location information every two seconds, every five seconds, or every 10 seconds. If the engine of the vehicle is not running, transmission module 220 may transmit location information once every two hours, once every hour, or once every 30 minutes, for example. Similarly, the duration of the transmission of vehicle information by transmission module 220 may be for a set time or based on vehicle information.

In some embodiments, transmitter 120 may be limited in range in that the signal of transmitter 120 may be received less than a mile, less than 2500 feet or less than 1500 feet from transmitter 120.

FIG. 3 is a schematic of receiver 110 in accordance with certain embodiments of the present disclosure. Receiver 110 includes RF antenna 330. RF antenna 330 receives the RF signal from transmitter 120. RF antenna 330 provides data received from transmitter 120 through receiver data path 322 to receiver processor 320. Receiver processor 320 stores, manipulates, and/or prepares data received through receiver data path 322 for display and/or query from a user. As recognized by one of ordinary skill in the art with the benefit of this disclosure, receiver processor 320 may be any electronic equipment capable of storing, manipulating, and/or preparing data received through receiver data path 322. In certain non-limiting embodiments, receiver processor 320 may be a laptop or desktop computer, a handheld device such as a PDA or smartphone, or tablet. Receiver processor 320 may provide output to display 310 through display data path 312 for display to a user. In an alternative embodiment, such as that shown in FIG. 4, receiver processor 320 may provide data and accept queries from remote processor 340. Remote processor 340 may be a device, for instance, carried by a user for use in locating or determining other information about the vehicle to which transmitter 120 is attached. Remote processor 340 may also be a laptop or other computer located remotely from processor 320. Remote processor 340 may communicate with a display. In still other embodiments, remote processor 340 may be a remote controller, such as that described as "remote controller 54" in U.S. Pat. No. 7,342,494, filed Jan. 27, 2004, which is hereby incorporated fully by reference. In these embodiments, receiver processor 320 may query remote processor 340 for such information that may be provided by "remote controller 54" as described in U.S. Pat. No. 7,342,494 and further described below. In some non-limiting embodiments, remote processor 340 may include multiple processors, such as for instance, multiple handheld devices, handheld devices and a remote controller, or handheld devices and a laptop or other computer. Remote controller 54 may include a graphical user interface (GUI) such that a user may, through such means as a touch screen, request and receive data regarding the location or vehicle data regarding a vehicle.

Receiver processor 320 or remote processor 340 may communicate with receiver database 350 through processor data path 352. Receiver database 350 may include data relating to location information and vehicle information associated with transmitters 120. Receiver database 350 may include a non-transitory, tangible computer readable storage medium.

Data may be transferred along data paths 212, 222, 312, 322, and 352 using any appropriate methods, including, but not limited to wired connection, wireless connection, internet connection, RF connection or combinations thereof. When data is transferred along processor data path 352 through the internet, location information and vehicle information may be obtained by remote processor 340 through such methods as a web browser or mobile application.

In certain embodiments, receiver processor 320 may communicate to display 310 or remote processor 340 location or vehicle information upon certain events based on information received or previously received by RF antenna 330 from transmitter 120. In non-limiting examples, receiver processor 320 may communicate to display 310 or remote processor 340 if transmitter 120 has been outside the perimeter of lot 130 for a pre-determined period a time, if transmitter 120 is outside the perimeter of lot 130 after a pre-determined time of day, if the amount of fuel in the vehicle is below a certain level, or if the charge level of a vehicle battery is lower than a set voltage. This communication may be, for instance, by text or e-mail.

In certain embodiments, receiver processor 320 may aggregate data received from multiple transmitters 120 and communicate aggregate location data and vehicle information to display 310 or remote processor 340. Non-limiting examples of such aggregate data compilation include reports of which vehicles have low fuel, which vehicles have low battery voltage, or transmitters 120 that have not reported for a pre-determined period of time, such as 24 hours.

In some embodiments, processor 320 or remote processor 340 or databases associated with receiver processor 320 or remote processor 340 may have stored a map of lot 130. In these embodiments, the location of transmitter 120 may be displayed on a map of lot 130 on display 310 or remote processor 340. Map 130 may be created, for instance, by physically mapping the GPS coordinates of the edges of lot 130 or by determining the edges of lot 130 from a previously constructed map of the lot site, such as through an internet mapping site.

Database 350 may be configured such that only transmitters 120 associated with a pre-determined set of identifiers that are transmitted by transmission module 220 are stored in processor 320 or are communicated to display 310 or remote processor 340.

In embodiments where at least one remote processor 340 is a remote controller such as that described as "remote controller 54" in U.S. Pat. No. 7,342,494, filed Jan. 27, 2004, additional information may be communicated to display 310 or another interactive remote processor 340. As transmitters 120 may be associated with particular vehicles, processor 320 may query remote controller 54 to determine vehicle details regarding that particular vehicle including such information as make, model, color, options installed, year of vehicle, body style, condition, cylinder type, mileage, stock number, VIN, and other information that may be stored in remote controller 54. Processor 320 may then communicate this information to remote processor 340, such as a handheld device, laptop or other computer or to display 310. Thus, location, vehicle information and vehicle details are made available to a user. Further, in certain embodiments, vehicle location and vehicle information may be communicated to remote controller 54; remote controller 54 may make such information available to a user when the vehicle key is made available to the user.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A vehicle management system comprising:
   a vehicle information module, the vehicle information module including a location determination module having a GPS data pathway to an RF transmission module, the vehicle information module having a vehicle information data pathway to an RF transmission module, the vehicle information module including a diagnostic connector including a power pin connector configured in accordance with OBD-II standards and configured to plug into an OBD-II port of a vehicle, wherein the vehicle information module is adapted to communicate with at least one computer system of the vehicle to gather at least one vehicle parameter; and
   a receiver comprising an RF antenna and a receiver processor wherein the RF transmission module is configured to only transmit GPS location information when the location determination module is within a car lot.

2. The vehicle management system of claim 1, wherein the at least one vehicle parameter is selected from a group consisting of battery voltage, fuel level, engine RPMs, distance traveled since codes last cleared, run time since engine start, and VIN.

3. The vehicle management system of claim 1, wherein the vehicle information module is configured to communicate with the at least one computer system of the vehicle using OBD-II standards.

4. The vehicle management system of claim 3, wherein the vehicle information module is in electrical contact with a vehicle battery.

5. The vehicle management system of claim 4, wherein the electrical contact is made through the power pin connector.

6. The vehicle management system of claim 4, wherein the vehicle information module is in electrical contact with the RF transmission module and the location determination module.

7. The vehicle management system of claim 1, wherein the vehicle information module is powered by a battery.

8. The vehicle management system of claim 1, wherein the location determination module is a GPS locator module.

9. The vehicle management system of claim 1, wherein the receiver processor has a processor data path to a receiver database.

10. The vehicle management system of claim 9, wherein the receiver database includes a non-transitory, tangible computer readable storage medium.

11. The vehicle management system of claim 10, wherein a map of a car lot is stored on the non-transitory, tangible computer readable storage medium of the receiver database.

12. The vehicle management system of claim 10, wherein location information associated with the vehicle information module is stored in the receiver database.

13. The vehicle management system of claim 1, wherein the processor has a display data path to a remote processor.

14. The vehicle management system of claim 1, wherein the remote processor is a remote controller.

15. The vehicle management system of claim 1, wherein the receiver is adapted to receive an RF transmission transmitted by the RF transmission module.

16. The vehicle managements system of claim 15, wherein the RF transmission is in the UHF band.

17. The vehicle managements system of claim 15, wherein the RF transmission utilizes the JenNet or ZigBee® protocol.

18. A process comprising:
   providing a vehicle management system comprising:
      a vehicle information module, the vehicle information module in electrical contact with a vehicle, the vehicle information module including a diagnostic connector including a power pin connector configured in accordance with OBD-II standards and configured to plug into an OBD-II port of a vehicle, the vehicle information module including a location determination module having a GPS data pathway, the vehicle information module including an RF transmission module, the vehicle information module having a vehicle information data pathway to the RF transmission module; and a receiver comprising an RF antenna, a receiver processor, and a receiver database, the receiver database including a non-transitory, tangible computer readable storage medium;

determining a location of the vehicle information module using the location determination module;

transmitting the location of the vehicle information module using the RF transmission module only when the vehicle information module is within a car lot;

receiving the location of the vehicle information module using the RF antenna;

storing the location of the vehicle information module in the receiver database;

collecting vehicle information from the vehicle using the vehicle information module;

transmitting vehicle information using the RF transmission module;

receiving the vehicle information using the RF antenna; and storing the vehicle information in the receiver database.

19. The process of claim 18, wherein the location information is the GPS coordinates of the vehicle information module.

20. The process of claim 18, wherein the RF transmission module transmits in the UHF bandwidth.

21. The process of claim 20, wherein the RF transmission module transmits the location information less than 2500 feet.

22. The process of claim 18, wherein the vehicle information is selected from the group consisting of VIN, battery voltage, alternator voltage, fuel level, engine RPMs, vehicle speed, distance traveled since codes last cleared, run time since engine start, or a combination thereof.

23. The vehicle management system of claim 1, wherein the vehicle information module is adapted to be removable from a vehicle.

24. The process of claim 18 further comprising:
determining whether an engine of the vehicle is running; and
transmitting the location of the vehicle information module using the RF transmission module more often when the engine of the vehicle is running than when the engine of the vehicle is not running.

* * * * *